US012556131B2

(12) United States Patent
Li et al.

(10) Patent No.: US 12,556,131 B2
(45) Date of Patent: Feb. 17, 2026

(54) SYSTEMS AND METHODS FOR TRACKER-LEVEL PROTECTION

(71) Applicant: Nextracker LLC, Fremont, CA (US)

(72) Inventors: Chen Li, Fremont, CA (US); Yang Liu, Mountain View, CA (US); Alexander W. Au, Oakland, CA (US)

(73) Assignee: NEXTRACKER LLC, Fremont, CA (US)

( * ) Notice: Subject to any disclaimer, the term of this patent is extended or adjusted under 35 U.S.C. 154(b) by 0 days.

(21) Appl. No.: 18/752,249

(22) Filed: Jun. 24, 2024

(65) Prior Publication Data
US 2024/0348199 A1 Oct. 17, 2024

Related U.S. Application Data

(62) Division of application No. 18/072,335, filed on Nov. 30, 2022, now Pat. No. 12,047,033.

(60) Provisional application No. 63/284,617, filed on Nov. 30, 2021.

(51) Int. Cl.
H02S 20/32 (2014.01)
H02S 40/38 (2014.01)
H02S 50/10 (2014.01)
B62D 5/00 (2006.01)
(Continued)

(52) U.S. Cl.
CPC .............. H02S 20/32 (2014.12); H02S 40/38 (2014.12); H02S 50/10 (2014.12); B62D 5/005 (2013.01); F24S 25/12 (2018.05); F24S 30/425 (2018.05)

(58) Field of Classification Search
CPC .......... H02S 20/32; H02S 40/38; H02S 50/10; B62D 5/005; F24S 25/12; F24S 30/425; Y02E 10/47
See application file for complete search history.

(56) References Cited

U.S. PATENT DOCUMENTS 7,116,066 B2  10/2006  Lin
8,904,774 B2  12/2014  Gee
11,133,775 B1  9/2021  Lobue et al.
(Continued)

FOREIGN PATENT DOCUMENTS

CN  205608530 U  9/2016

OTHER PUBLICATIONS

PCT Search Report issued in PCT Patent Application No. PCT/US2022/051407 dated Apr. 4, 2023.

Primary Examiner — Michael Y Sun
(74) Attorney, Agent, or Firm — Fredrikson & Byron, P.A.

(57) ABSTRACT

A solar tracking system includes a solar array, a support structure configured to support the solar array, a driveshaft coupled to the support structure, a base configured to rotatably support the driveshaft, and an articulation system coupled to the driveshaft and configured to articulate the driveshaft relative to the base. The articulation system includes a gearbox coupled to the driveshaft. The solar tracking system also includes a motor mechanically operably coupled to the gearbox to cause the driveshaft to rotate, and a controller that determines a fault caused by the winding up of the driveshaft, and, in response to determining the fault, shorting the windings of the motor and/or providing power, which is generated by the motor when the unwinding driveshaft drives the rotation of the motor, to a load, such as an energy storage device, a resistive load, and/or a heating element.

7 Claims, 10 Drawing Sheets

(51) Int. Cl.
 *F24S 25/12* (2018.01)
 *F24S 30/425* (2018.01)

(56) References Cited

U.S. PATENT DOCUMENTS

| | | |
|---|---|---|
| 11,283,395 B2 | 3/2022 | Kresse et al. |
| 11,387,771 B2 | 7/2022 | Au et al. |
| 2015/0207452 A1 | 7/2015 | Werner et al. |
| 2016/0329860 A1 | 11/2016 | Kalus et al. |
| 2017/0353146 A1 | 12/2017 | Praca et al. |
| 2018/0091088 A1 | 3/2018 | Barton et al. |
| 2019/0107598 A1 | 4/2019 | Plourde et al. |
| 2019/0296686 A1* | 9/2019 | Kresse .................... H02S 20/10 |
| 2020/0321893 A1* | 10/2020 | Hossain ................. B62D 5/046 |
| 2020/0400772 A1 | 12/2020 | Corio |
| 2021/0194416 A1 | 6/2021 | Praca et al. |

\* cited by examiner

SYSTEMS AND METHODS FOR TRACKER-LEVEL PROTECTION

RELATED APPLICATIONS

This application is a divisional of U.S. patent application Ser. No. 18/072,335, filed Nov. 30, 2022 which claims the benefit of, and priority to, U.S. Provisional Patent Application Ser. No. 63/284,617, filed on Nov. 30, 2021, the entire content of both of which are incorporated by reference herein.

TECHNICAL FIELD

This disclosure relates to solar power generation systems, and more particularly, to systems and methods for protecting a solar tracker from damage while adjusting the orientation of the solar power generation components to track the location of the sun.

BACKGROUND

Solar cells and solar panels are most efficient in sunny conditions when oriented towards the sun at a certain angle. Many solar panel systems are designed in combination with solar trackers, which follow the sun's trajectory across the sky from east to west in order to maximize the electrical generation capabilities of the systems. The relatively low energy produced by a single solar cell requires the use of thousands of solar cells, arranged in an array, to generate energy in sufficient magnitude to be usable, for example, as part of an energy grid. As a result, solar trackers have been developed that are quite large, spanning hundreds of feet in length.

The solar trackers include a driveshaft, which drives the rotation of the solar panels, an electric motor, which drives the rotation of the driveshaft, and a controller, which controls the operation of the motor. If something such as snow impedes the rotation of the solar panels, the driveshaft starts to wind up before the controller turns off the motor. After the motor turns off, the energy built up in the wound-up driveshaft is immediately released through the counter rotation of the driveshaft, which causes the motor to rotate and act as a generator. That energy may temporarily or permanently damage the controller, thereby limiting or altogether impeding the proper functioning of the solar tracker.

SUMMARY

In one aspect, the disclosure features a solar tracking system. The solar tracking system includes a solar array, a support structure that supports the solar array, a driveshaft coupled to the support structure, and a base that rotatably supports the driveshaft. The solar tracking system also includes an articulation system coupled to the driveshaft and configured to articulate the driveshaft relative to the base. The articulation system includes a gearbox coupled to the driveshaft and a motor mechanically operably coupled to the gearbox to cause the driveshaft to rotate. The solar tracking system also includes a controller coupled to the motor and configured to: determine a fault caused by the winding up of the driveshaft, and in response to determining the fault, shorting the windings of the motor.

Aspects of the disclosure may implement one or more of the following features. The articulation system may include an actuator having a first end portion and a second, opposite end portion. The first end portion may be rotatably coupled to the base and the second end portion may be coupled to the gearbox. The actuator may be configured to extend and retract. The extension of the actuator may cause the driveshaft to rotate about the base in a first direction and the retraction of the actuator may cause the driveshaft to rotate about the base in a second, opposite direction.

The controller may include power circuitry and, in response to determining the fault, the controller may be configured to control the power circuitry to provide power generated by the unwinding of the driveshaft to a load. The load may be an energy storage device or a heating element. The energy storage device may be a battery or an ultracapacitor.

The solar tracking system may include bases. Each base may rotatably support a portion of the driveshaft and articulation systems may correspond to a respective base of the bases. The solar tracking system may include driveshafts interconnecting the articulation systems such that rotation of the driveshafts causes a respective actuator associated with each articulation system to extend or retract in unison. The solar tracking system may further include a motor that is mechanically coupled to the driveshafts. Actuation of the motor may cause each driveshaft to rotate, which in turn, causes each actuator of the plurality of articulation systems to extend or retract in unison.

Each articulation system may include a motor that is mechanically coupled to each respective gearbox of the articulation systems. Each motor may actuate a respective actuator of the articulation systems in unison.

The actuator may include a body portion, a nut coupled to the body portion, and a power screw threadably coupled to the nut. Rotation of the power screw relative to the nut may cause the power screw to retract or advance within the body portion.

The support structure may be supported on the driveshaft at a geometric center of rotation of the support structure. The support structure may be supported on the driveshaft at a center of mass of the support structure and the solar array.

In another aspect, the disclosure features a method of articulating a solar tracking system. The method includes determining a position of the sun relative to a solar array disposed on a driveshaft, the driveshaft rotatably supported by bases; actuating a motor mechanically coupled to the driveshaft based on the determined position of the sun relative to the solar array; determining a fault caused by a winding up of the driveshaft; and, in response to determining the fault, controlling power circuitry to provide power generated in the motor by the unwinding of the driveshaft to a load.

Aspects of the disclosure may implement one or more of the following features. Determining the fault may include detecting a winding up of the driveshaft by a torsion sensor disposed on or in the driveshaft. The method may include changing a length of actuators associated with the bases to rotate the solar array relative to the bases. The rotation of the solar array may correct the orientation of the solar array relative to the sun. Changing the length of the actuators may include causing a motor mechanically coupled to a gearbox associated with the actuators to rotate. The rotation of the motor may cause the gearbox to change the length of the actuators.

Changing the length of the actuators may include causing a motor coupled to driveshafts to cause gearboxes associated with a respective actuator of the actuators to rotate. Rotation of the motor may cause the driveshafts to rotate, which in turn, may cause the gearboxes to change the length of the actuators. The method may include: determining a fault caused by a winding up of one of the driveshafts and, in response to determining the fault, controlling power circuitry to provide power generated in the motor by the unwinding of the one of the driveshafts to a load.

Changing the length of the actuators may include causing motors coupled to respective gearboxes associated with the actuators to rotate. Rotation of the motors may cause each respective gearbox to change the length of each respective actuator. The load may be a battery or a heating element.

BRIEF DESCRIPTION OF THE DRAWINGS

Various aspects and features of the present disclosure are described hereinbelow with reference to the drawings, wherein.

DETAILED DESCRIPTION

Figure 1:
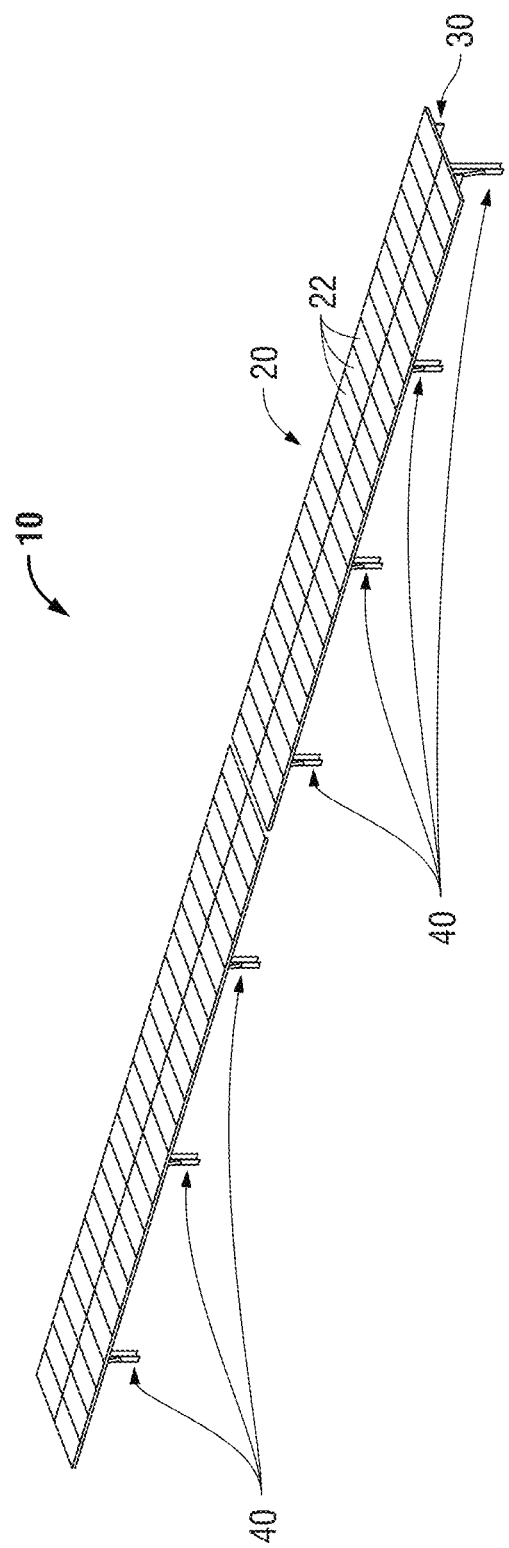
FIG. 1 is a top, perspective view of a solar tracking system provided in accordance with the present disclosure configured to articulate the angle of a solar array to track the location of the sun.
Figure 2:
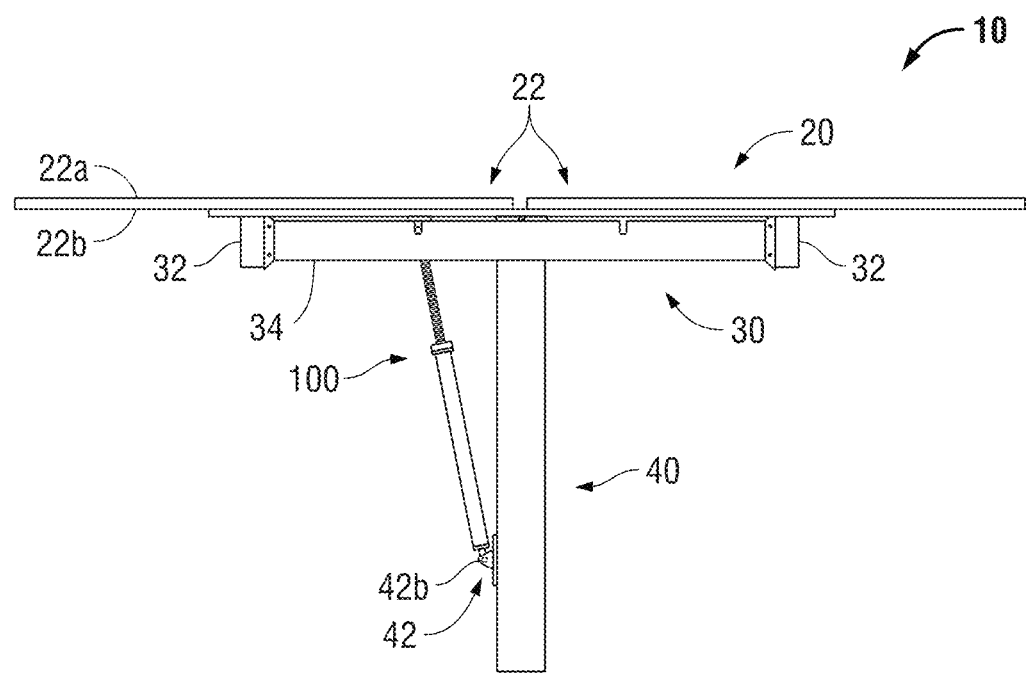
FIG. 2 is a side view of the solar tracking system of FIG. 1.

The present disclosure is directed to solar tracking systems and methods for articulating a solar tracking system. The solar tracking system includes a solar array that is supported by a support structure. The support structure, in turn, is rotatably supported by a plurality of bases that are configured to be anchored in the ground or to a stationary structure. An articulation system is coupled to the support structure and enables the selective rotation of the solar array about the base to track the location of the sun. The articulation system includes an actuator that is coupled to a gearbox, the actuator being rotatably coupled to the base and the gearbox being rotatably coupled to the support structure. The solar tracking system includes a plurality of articulation systems where each articulation system is associated with a respective base. As can be appreciated, using multiple actuators provides additional support to the solar array to reduce twist and reduce the size of components used in the solar tracking system.

The solar tracking system may include a single motor to drive the plurality of articulation systems or may include a plurality of motors associated with respective articulation system. Where only one motor is used, a plurality of driveshafts interconnects each gearbox such that the motor may drive each actuator simultaneously. The one or more motors may include an AC induction motor, a stepper motor, a permanent magnet brush DC motor, or a brushless DC motor. To reduce windup and inhibit buckling of each driveshaft, one or more brackets are coupled to the support structure or solar array which supports the driveshafts at certain intervals. The plurality of driveshafts may be retained or removed where there is a plurality of motors employed by the solar tracking system. In this manner, each motor is electrically coupled to one another to ensure actuation of the plurality of articulation systems occurs in unison to inhibit twist of the support structure or solar array.

The gearbox includes an outer casing, an input shaft which is rotatably supported by the outer casing, a yoke which is rotatably supported by the outer casing in a transverse direction to the input shaft, and an idler shaft that is supported by the yoke. An outer surface of the idler shaft includes a transverse bore that is capable of receiving the input shaft therein. The actuator is rotatably supported at a first end by the base and the second end of the actuator is coupled to the yoke. Using this construction, the articulation system is able to accommodate thermal expansion of the support structure. Specifically, as the support structure expands and contracts, the location of the input shaft changes. To accommodate this change in location, the yoke is permitted to rotate in a direction along the driveshaft. The transverse bore includes an inner dimension that is large enough to accommodate ±10° of rotation by the actuator relative to the driveshafts. In this manner, the first portion of the actuator may remain stationary while the second portion of the actuator may be offset relative thereto, which helps inhibit any bind or stresses that may build up as a result of the thermal expansion of the driveshaft.

The support structure may be rotatably supported at either the geometric center of rotation or the center of mass of the support structure and solar array combined. Rotatably supporting the support structure at is geometric center of rotation introduces an unbalanced load as the support structure is rotated about the base. Specifically, the amount of torque required to articulate the support structure increases as the support structure is rotated from an angled position relative to the base to a horizontal position relative to the base. By rotatably supporting the support structure at the center of mass of the support structure and solar array combined, the torque required to rotate the support structure remains relatively constant through the range of motion of the solar tracking system. This reduces the energy required to articulate the support structure and may reduce the number of differing components, as the components no longer have to be designed for the unbalanced load.

Aspects of the disclosure are now described in detail with reference to the drawings in which like reference numerals designate identical or corresponding elements in each of the several views. In the drawings and in the description that follows, terms such as front, rear, upper, lower, top, bottom, and similar directional terms are used simply for convenience of description and are not intended to limit the disclosure. In the following description, well-known functions or constructions are not described in detail to avoid obscuring the present disclosure in unnecessary detail.

With reference to FIGS. 1-5, a solar tracking system capable of tracking the location of the sun provided in accordance with the present disclosure is illustrated and generally identified by reference numeral 10. The solar tracking system 10 includes a solar array 20, a support structure 30 that is configured to support the solar array 20, a base 40 that is configured to rotatably support the support structure 30, and an articulation system 100 (FIG. 2) that is configured to articulate the solar array 20 and support structure 30 relative to the base 40. The solar array 20 includes a plurality of photovoltaic modules 22, each of which is mechanically and electrically coupled to one another, although it is contemplated that each photovoltaic module 22 may be mechanically and/or electrically insulated from one another. In aspects, the photovoltaic modules 22 may be any suitable photovoltaic module capable of generating electrical energy from sunlight, such as monocrystalline silicon, polycrystalline silicon, thin-film, etc. The photovoltaic modules 22 define an upper surface 22a and an opposite, bottom surface 22b. As can be appreciated, the upper surface 22a of the photovoltaic modules 22 includes the photovoltaic cells (not shown) while the bottom surface 22b includes any suitable means for fixedly or selectively coupling the photovoltaic modules 22 to the support structure 30, such as mechanical fasteners (e.g., bolts, nuts, etc.), adhesives, welding, etc., although it is envisioned that the photovoltaic modules 22 may be bi-facial photovoltaic modules, in which case the bottom surface 22b may also include photovoltaic cells such that energy may be captured from both the upper and bottom surfaces 22a, 22b.

In aspects, the photovoltaic cells may be disposed within a suitable frame (not shown) which includes suitable means for fastening the photovoltaic modules 22 to the support structure 30. In this manner, the frame may include fastening means on a bottom surface thereof (not shown), or clamps or other suitable fasteners (e.g., Z-brackets, C-clamps, angle brackets, etc.) may be utilized to abut a portion of the frame and selectively or fixedly couple the frame to the support structure 30.

The support structure 30 includes a pair of parallel beams 32 (FIG. 3) disposed in spaced relation to one another and extending along a length of the solar tracking system 10. Although generally illustrated as being a C-channel, it is contemplated that the pair of parallel beams 32 may be any suitable beam capable of supporting the solar array 20, such as box beams, I-beams, H-beams, circular or round beams, etc. In aspects, each beam of the pair of parallel beams 32 may include the same profile or may include different profiles, depending upon the installation needs of the solar tracking system 10.

Figure 3:
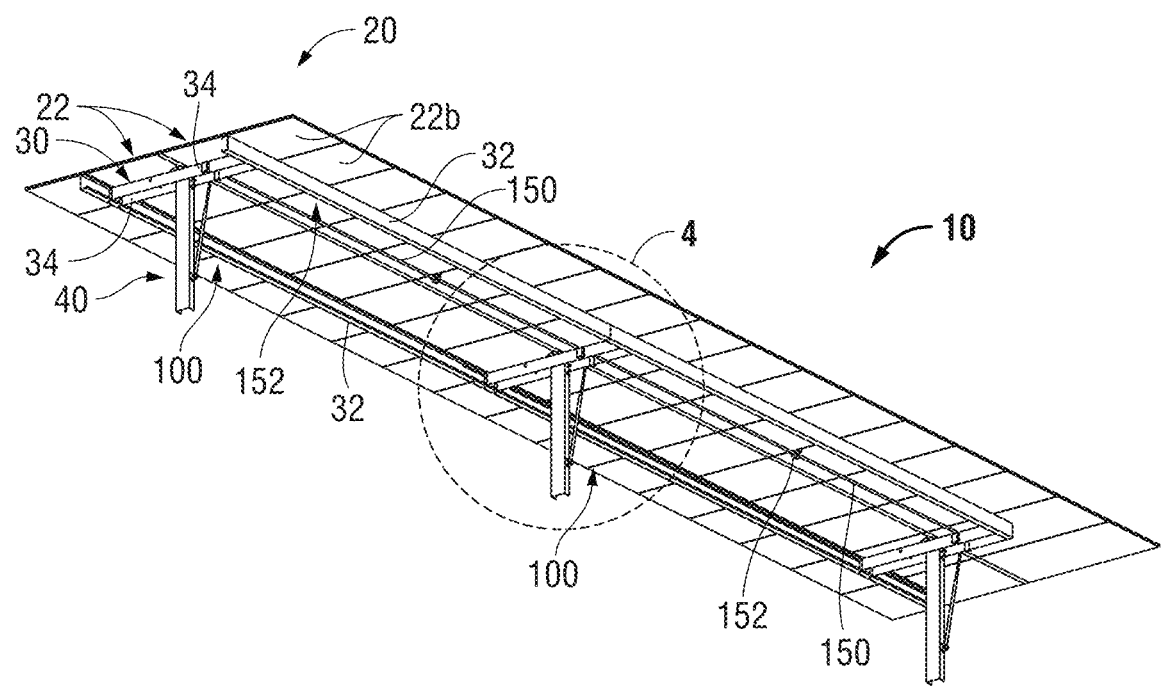
FIG. 3 is a bottom, perspective view of the solar tracking system of FIG. 1.
Figure 6:
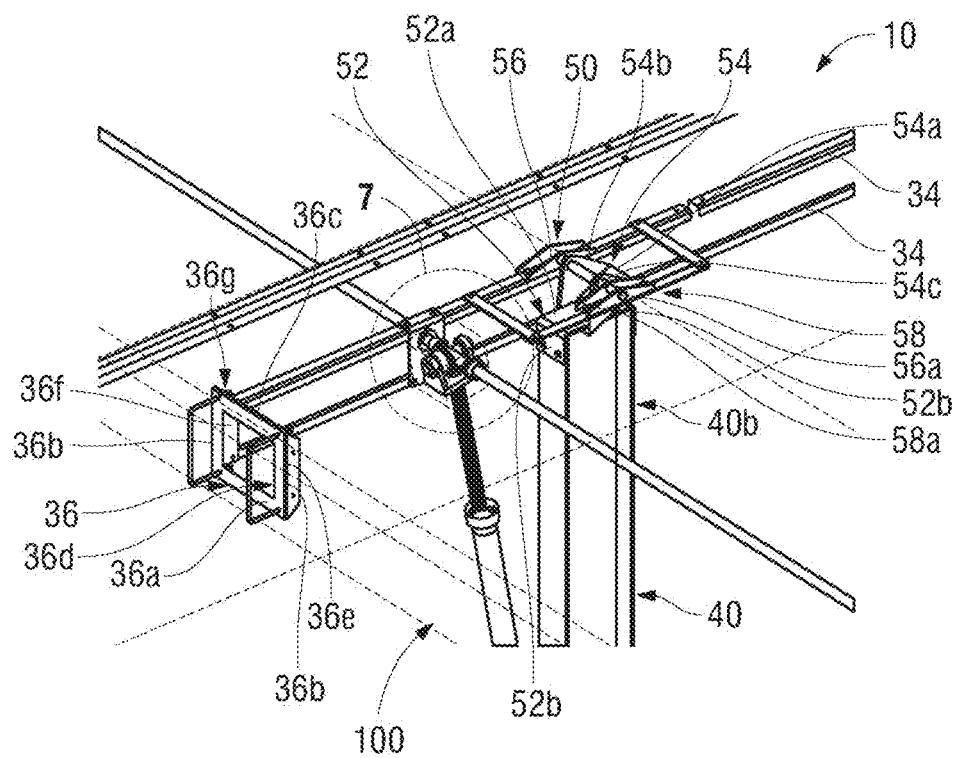
FIG. 6 is a top, perspective view of an actuator of the articulation system of FIG. 5 shown coupled to the solar tracking system of FIG. 1.

With additional reference to FIG. 6, the support structure 30 includes pairs of transverse beams 34 defining opposed ends 34a and 34b (FIG. 3). The pairs of transverse beams 34 are disposed parallel to one another and are spaced apart to receive a portion of the base 40, such that the support structure 30 may articulate without the base 40 interfering with articulation of the support structure 30 relative thereto, as will be described in further detail hereinbelow. Although generally illustrated as being a C-channel, it is contemplated that the pair of transverse beams 34 may be any suitable beam capable of supporting the solar array 20, such as box beams, I-beams, H-beams, etc. In aspects, each beam of the pairs of transverse beams 34 may include the same profile or may include different profiles, depending upon the installation needs of the solar tracking system 10.

Each end of the opposed ends 34a, 34b of the pairs of transverse beams 34 is coupled to a respective beam of the pair of parallel beams 32. In this manner, an end cap 36 is disposed adjacent to each end 34a or 34b of each beam of the pair of transverse beams 34. The end cap 36 defines a generally planar surface 36a extending between opposed side surfaces 36b and top and bottom surfaces 36c. Although generally illustrated as having rectangular outer profile, other suitable profiles are contemplated, such as square, hexagonal, circular, oval, etc. The planar surface 36a defines a bore 36d therethrough. Although generally illustrated as having a profile corresponding to the outer profile of the planar surface 36a, it is contemplated that the profile of the bore 36d may be any suitable profile, such as square, hexagonal, circular, oval, etc. and may be different than the profile of the planar surface 36a. The planar surface 36a defines a first pair of flanges 36e disposed adjacent the opposed side surfaces 36b and extending between the top and bottom surfaces 36c (FIG. 6). The planar surface 36a defines a second pair of flanges 36f disposed adjacent the bore 36d and oriented parallel to the first pair of flanges 36e such that a channel 36g is defined between each of the first and second pairs of flanges 36e, 36f. The channels 36g are configured to receive a corresponding end 34a, 34b of each beam of the pair of transverse beams 34 such that the pair of transverse beams 34 may be coupled to the first and second pair of flanges 36e, 36f using any suitable means, such as mechanical fasteners, adhesives, welding, or the like.

Although illustrated as having a distance between the top and bottom surfaces 36c that is greater than the height of the pair of parallel beams 32, it is contemplated that the cap 36 may have a distance between the top and bottom surfaces 36c that is the same as or less than the height of the pair of parallel beams 32. With continued reference to FIG. 6, the cap 36 is fixedly or selectively coupled to each respective beam of the pair of parallel beams using any suitable means, such as mechanical fasteners, adhesives, welding, etc.

Figure 4:
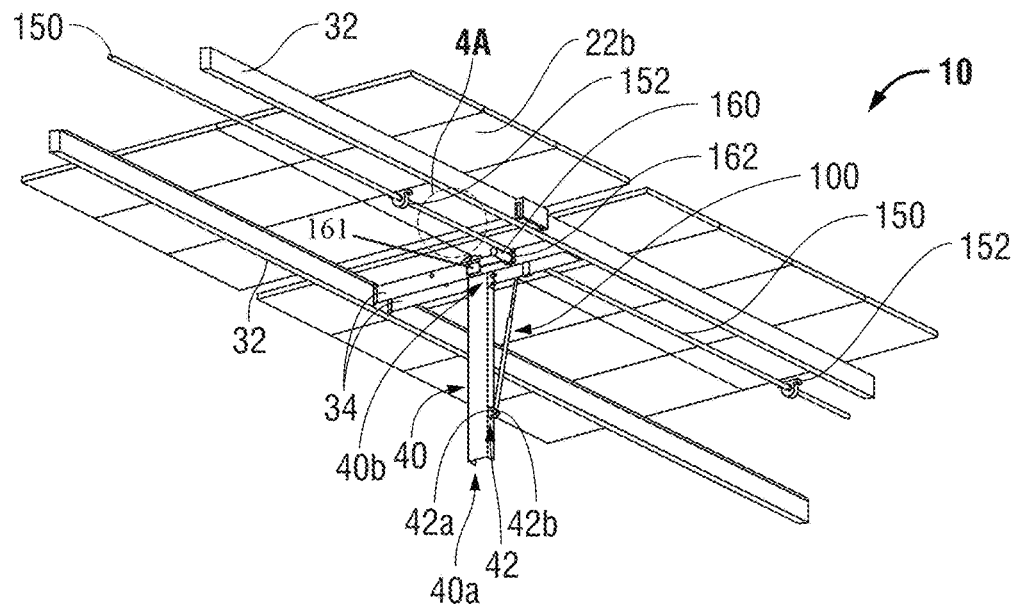
FIG. 4 is an enlarged view of the area of detail indicated in FIG. 3.

With reference to FIGS. 4 and 6, the base 40 defines a generally C-shaped profile, although it is contemplated that the base may be any suitable beam capable of supporting the solar array 20 and the support structure 30, such as box beams, I-beams, H-beams, etc. The base 40 extends between a first end portion 40a configured to be anchored in the ground and an opposite, second end portion 40b configured to rotatably support the support structure 30. In this manner, a pivot assembly 50 (FIG. 6) is coupled to the second end portion 40a and includes a support 52, a pivot 54, a pivot pin 56, and a pair of brackets 58. The support 52 defines a generally C-shaped profile defining a planar portion 52a and a pair of opposed flanges 52b disposed on opposing end portions thereof. The pair of opposed flanges 52b is spaced apart such that the second end portion 40a of the base 40 is interposed therebetween and the planar portion 52a abuts the second end portion 40a, although it is contemplated that planar portion 52a of the support 52 may be spaced apart from the second end portion 40a of the base. The pair of opposed flanges 52b is fixedly or selectively coupled to the second end portion 40a using any suitable means, such as mechanical fasteners, adhesives, welding, etc. An actuator mounting flange 42 (FIG. 4) is disposed on an outer surface of the base 40 adjacent to the first end portion 40a. It is contemplated that the actuator mounting flange 42 may be fixedly or selectively coupled to the base 40 using any suitable means, such as mechanical fasteners, adhesives, welding, etc. Although generally illustrated as defining a generally C-shaped profile, it is contemplated that the actuator mounting flange 42 may define any suitable profile, such as square, rectangular, etc. In this manner, the actuator mounting flange 42 defines a pair of opposed flanges 42a extending from a planar surface that is coupled to the outer surface of the base 40. In aspects, the actuator mounting flange 42 may include a pair of independent flanges 42a that are individually coupled to the outer surface of the base 40. The pair of opposed flanges 42a defines a bore 42b therethrough that is configured to enable a pin (not shown) or other suitable means for rotatably coupling a portion of the articulation system 100 thereto when a portion of the articulation system 100 is interposed between the pair of opposed flanges 42a.

The pivot 54 defines a generally C-shaped profile having a planar portion 54a and a pair of opposed flanges 54b extending therefrom. Although generally illustrated as having a triangular profile, it is contemplated that the pair of opposed flanges 54b may include any suitable profile such as square, rectangular, oval, etc. In aspects, each flange of the pair of opposed flanges 54b may have the same profile or a different profile. The pair of opposed flanges 54b define a corresponding pair of through-holes 54c therethrough that are configured to receive the pivot pin 56 therein.

As illustrated in FIG. 6, when the pivot pin 56 is received within the pair of opposed flanges 54b, the pivot pin 56 extends beyond each flange of the pair of opposed flanges 54b to engage a respective bracket of the pair of brackets 58. The pivot pin 56 defines a generally cylindrical profile extending between opposed end surfaces 56a. Each end surface of the opposed end surfaces 56a defines a relief (not shown) therein and extending toward one another. In this manner, the opposed end surfaces 56a define a generally D-shaped profile, although any suitable profile that is capable of inhibiting rotation of the pivot pin 56 relative to the pair of brackets 58 is contemplated, such as hexalobe, oval, square, rectangular, etc.

The pair of brackets 58 defines a generally C-shaped profile having a planar portion 58a and a pair of opposed flanges 58b extending therefrom. Although generally illustrated as having a triangular profile, it is contemplated that the pair of opposed flanges 58b may include any suitable profile, such as square, rectangular, oval, etc. In aspects, each flange of the pair of opposed flanges 58b may have the same profile or a different profile. The pair of opposed flanges defines a corresponding pair of through-bores (not shown) therethrough that are configured to fixedly receive the pivot pin 56 therein. In this manner, each through-hole of the pair of through-holes defines a profile that is complementary to that of the profile of each corresponding end surface of the opposed end surfaces 56a of the pivot pin. As can be appreciated, the matching profiles of the through-holes and the opposed end surfaces 56a ensure that each bracket of the pair of brackets 58 remains aligned with one another to minimize or eliminate twisting of the support structure 30 (e.g., torque applied to one end surface is transferred through the pivot pin 56 to the opposite end surface of the opposed end surfaces 56a). In aspects, the pivot pin 56 may not include a D-shaped profile an can be coupled to the pair of brackets 58 by friction fit, staking, adhesives, mechanical fasteners, welding, etc. The planar portion 58a is configured to be fixedly or selectively coupled to a corresponding beam of the pairs of transverse beams 34 to rotatably couple the support structure 30 to the base 40.

Figure 7:
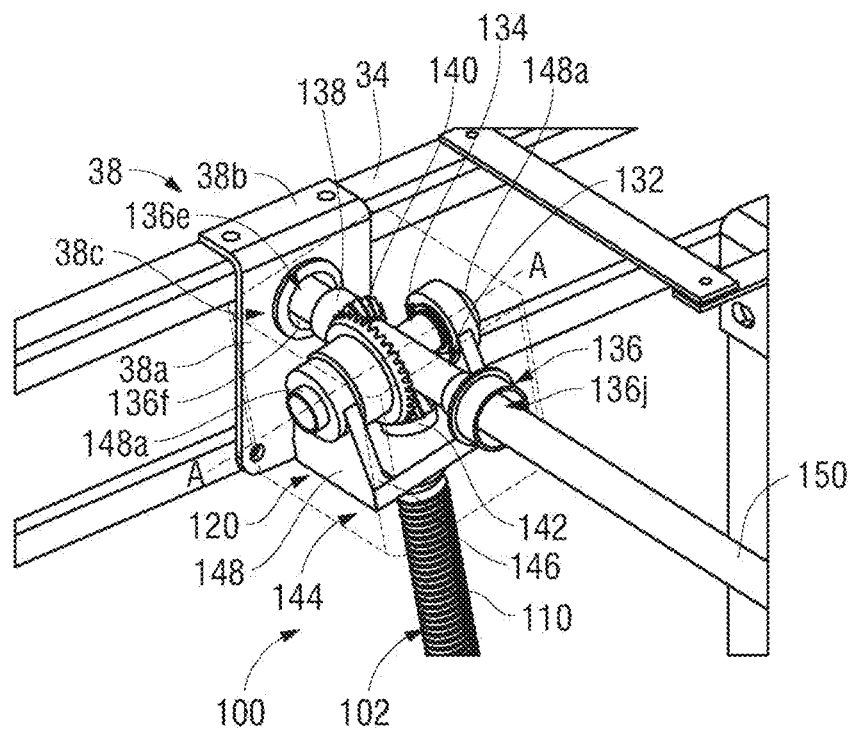
FIG. 7 is an enlarged view of the area of detail indicated in FIG. 6.
Figure 8:
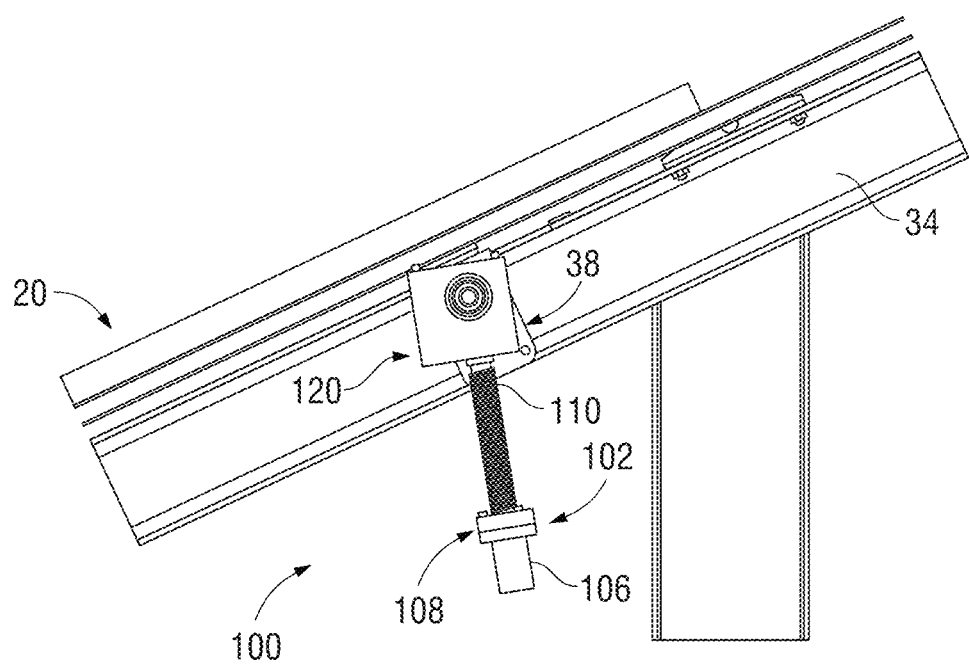
FIG. 8 is a side view of the actuator of FIG. 6 shown coupled to the solar tracking system of FIG. 1.

With additional reference to FIG. 7, the support structure 30 includes a pair of shear plates 38 having a generally L-shaped profile, although other suitable profiles are contemplated, such as C-shaped, etc. In this manner, each shear plate 38 includes a generally planar portion 38a and a flange 38b disposed at an end portion thereof and extending perpendicular therefrom. As can be appreciated, the flange 38b is configured to abut an upper portion of a corresponding beam of the pairs of transverse beams 34. The planar portion 38a defines a hole 38c therethrough that is configured to receive a bearing or bushing of the articulation system 100, as will be described in further detail below. As illustrated in FIG. 7, the pair of shear plates 38 is disposed in opposed relation to one another on a respective beam of the pairs of transverse beams 34.

Turning now to FIGS. 7-14, the articulation system 100 is illustrated and includes an actuator 102 and a gearbox 120. The actuator 102 includes a tubular body 106, a nut 108, a power screw 110, and a heim joint assembly 112. The tubular body 106 of the actuator 102 extends between opposed end surfaces 106a and 106b. Although generally illustrated as having a cylindrical profile, it is contemplated that the tubular body 106 may include any suitable profile, such as square, rectangular, oval, hexagonal, etc. The opposed end surfaces 106a, 106b define a through-hole 106c therethrough that is configured to receive the nut 108 adjacent the end surface 106a and a heim joint assembly 112 adjacent the end surface 106b. The nut 108 (FIG. 14) includes a washer 108a and a body portion 108b. The washer 108a defines a generally planar configuration having a generally circular profile corresponding to the profile of the tubular body 106. As can be appreciated, the washer 108a may include any suitable profile and may include the same or different profile than the tubular body 106. The washer 108a defines a through-hole 108c therethrough that is configured to receive a portion of the body portion 108b therethrough. The washer 108a is coupled to the end surface 106a of the tubular body 106 using any suitable means, such as mechanical fasteners, friction fit, adhesives, welding, etc.

The body portion 108b of the nut 108 defines a generally cylindrical profile having an outer diameter generally the same as an outer diameter of the tubular body 106, although other suitable configurations are contemplated. The body portion 108b extends between opposed end surfaces 108d and 108e. The end surface 108e defines an annular relief 108f therein extending towards the end surface 108d and through an outer surface 108g of the nut 108. The annular relief 108f terminates in a face 108g oriented opposite to the end surface 108d and is configured to abut a portion of the washer 108a. Although illustrated as being selectively coupled to the washer 108a using mechanical fasteners (i.e., bolts, screws, etc.), it is contemplated that the body portion 108b of the nut 108 may be selectively coupled to the washer 108a using any suitable means, and in aspects, may be fixedly coupled to the washer 108a using any suitable means, such as adhesives, friction fit, welding, etc. The opposed end surfaces 108d, 108e of the body portion 108b define a threaded bore 108h therethrough that is configured to threadably engage the power screw 110, such that the power screw 110 can translate therewithin when rotated in a first or second direction relative to the nut 108, as will be described in further detail hereinbelow.

Figure 9:
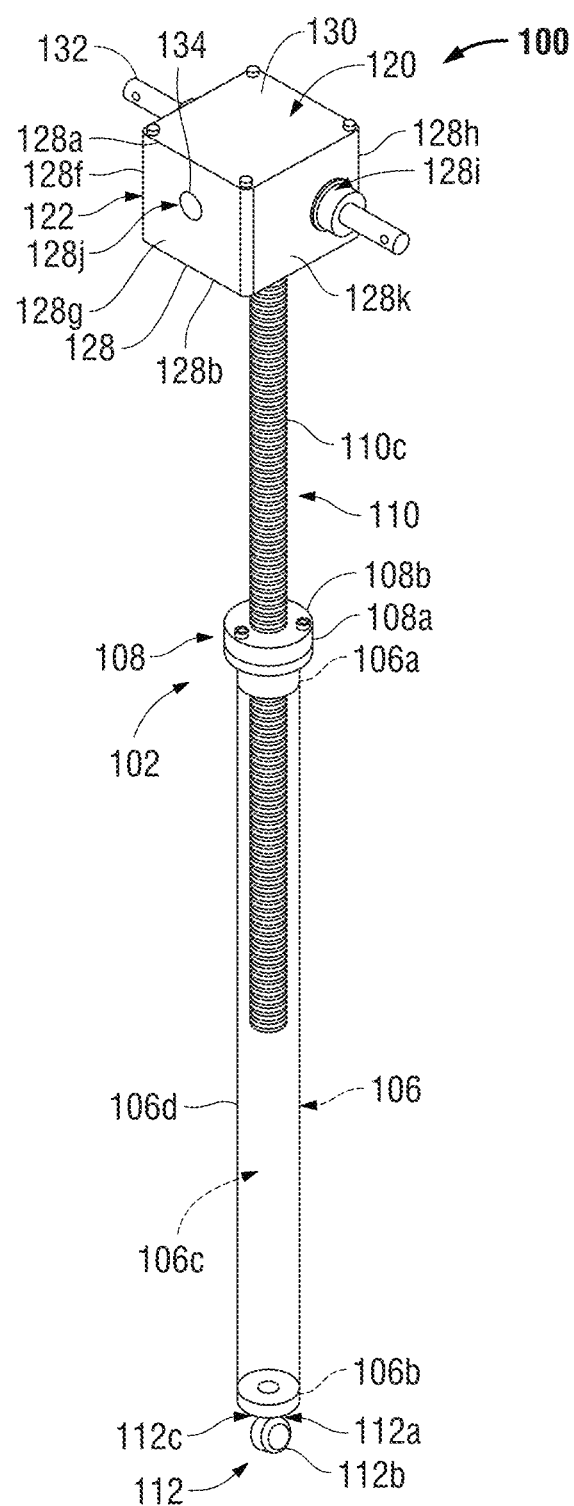
FIG. 9 is a perspective view of the actuator of FIG. 6.
Figure 10:
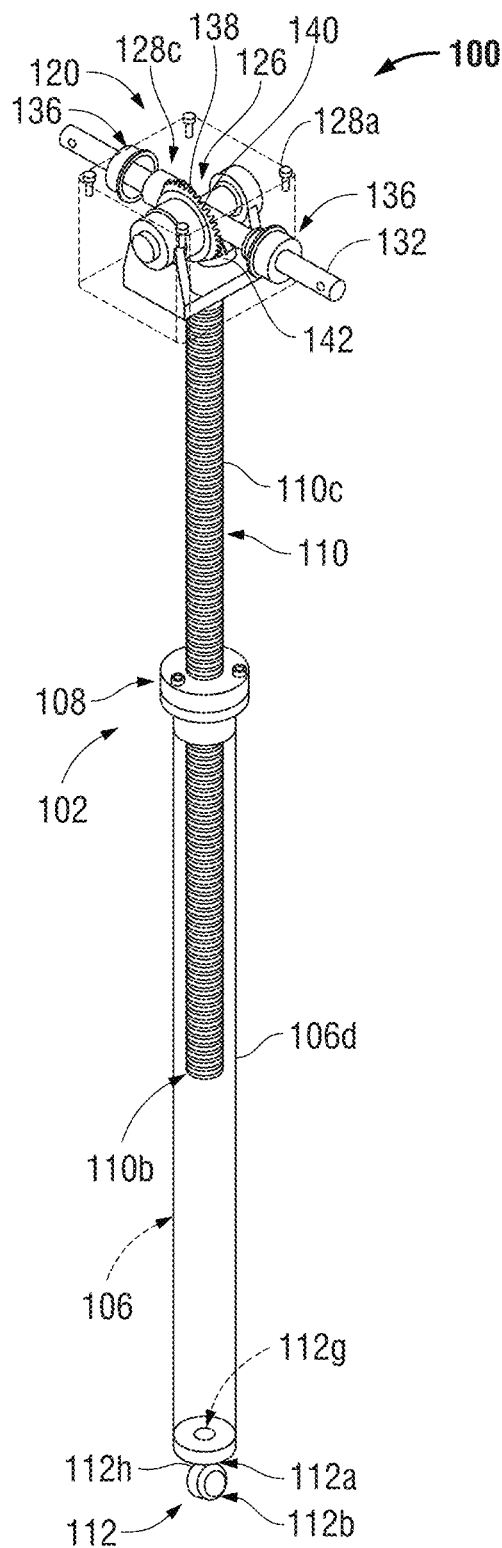
FIG. 10 is a perspective view of the actuator of FIG. 6 shown with an outer casing of a gearbox of the actuator of FIG. 6 in phantom.
Figure 11:
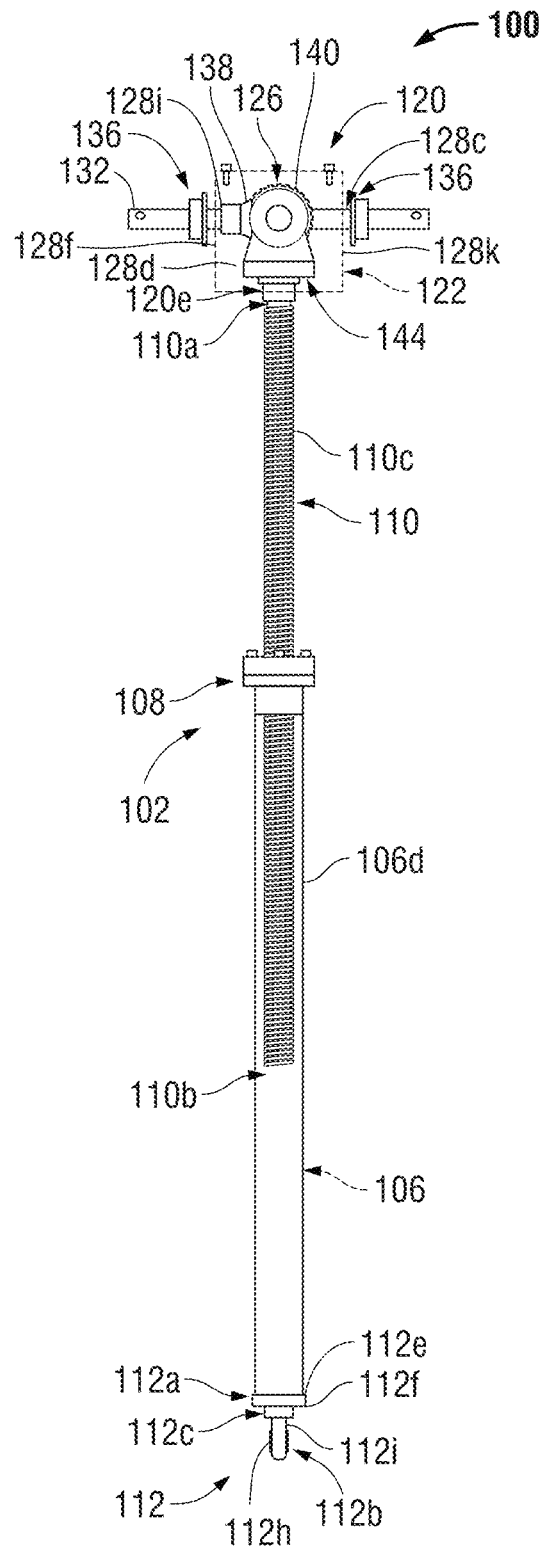
FIG. 11 is a front view of the actuator of FIG. 6 shown with the outer casing of the gearbox of the actuator of FIG. 6 in phantom.
Figure 12:
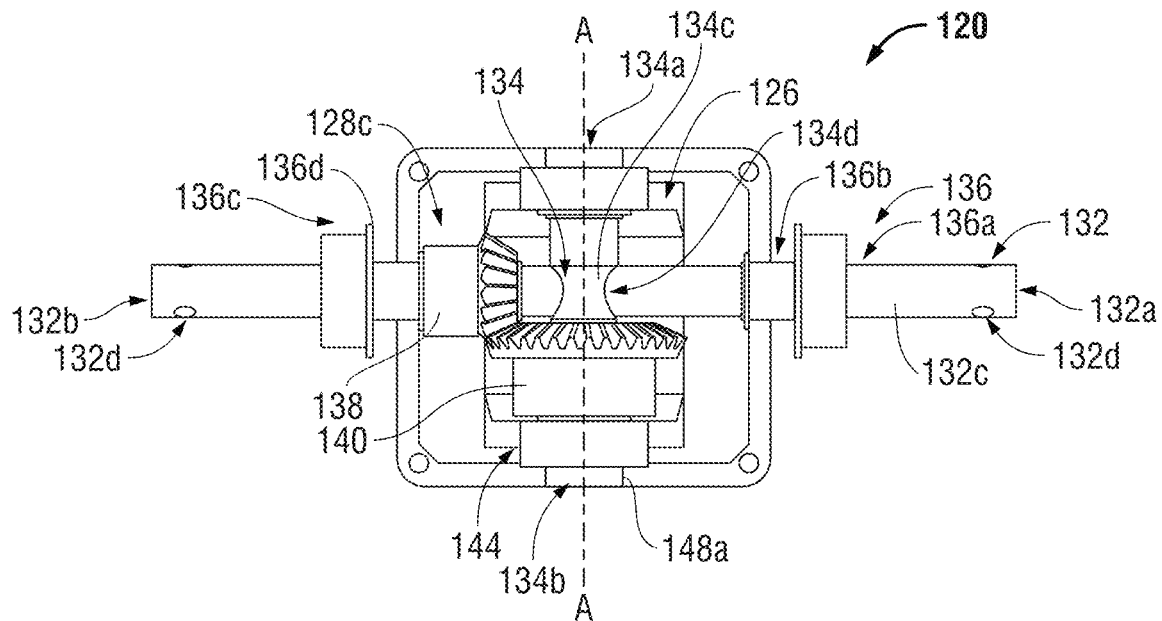
FIG. 12 is a top view of the actuator of FIG. 6 shown with the outer casing of the gearbox of the actuator of FIG. 6 in phantom.
Figure 13:
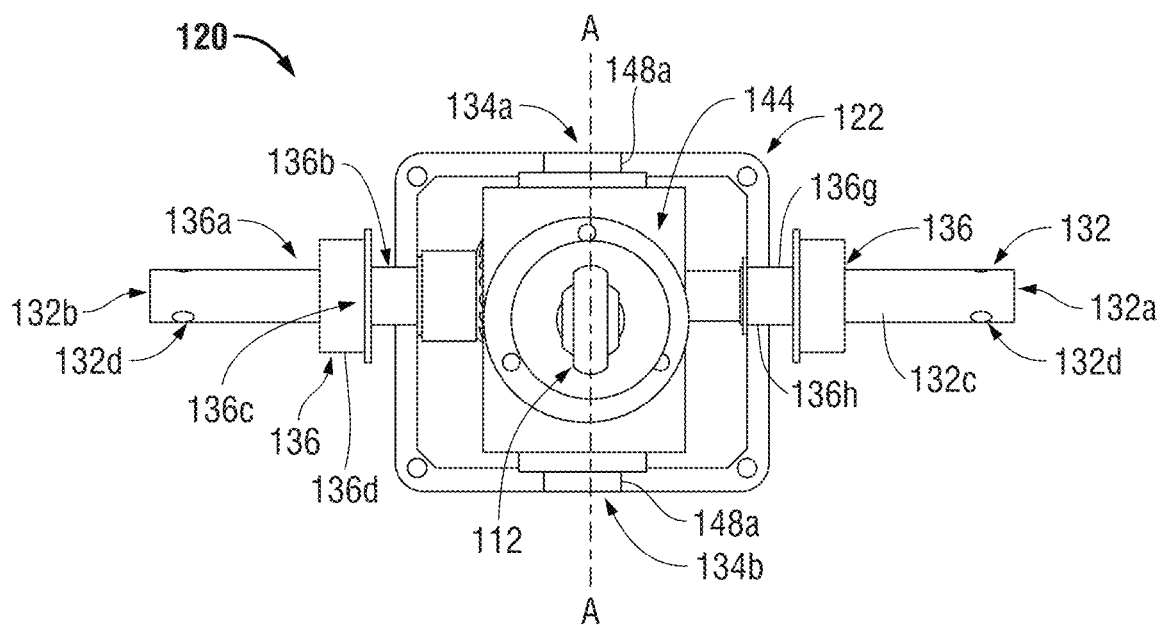
FIG. 13 is a bottom view of the actuator of FIG. 6 shown with the outer casing of the gearbox of the actuator of FIG. 6 in phantom.
Figure 14:
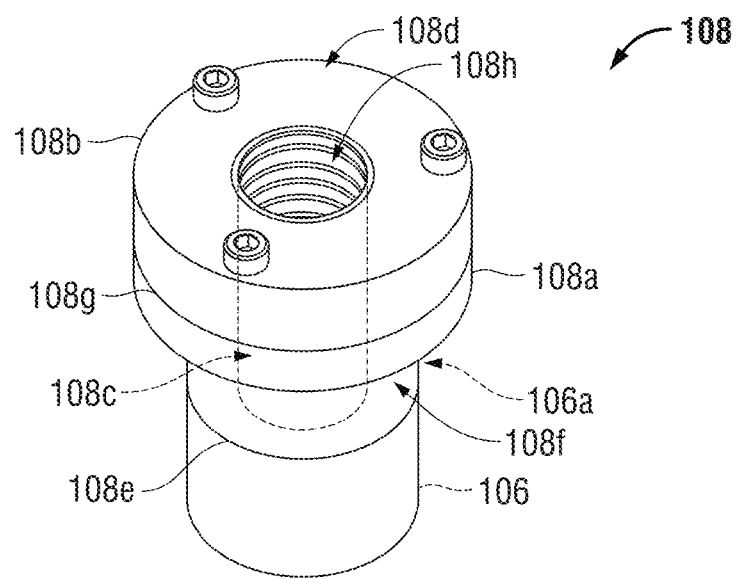
FIG. 14 is a perspective view of a nut of the actuator of FIG. 6.

With reference to FIGS. 9-11, the heim joint assembly 112 includes a heim joint washer 112a, a heim joint 112b, and a heim joint nut 112c. The heim joint washer 112a extends between opposed end surfaces 112e and 112f and defines a generally cylindrical profile that is complimentary to the profile of the tubular body 106, although it is contemplated that the profile of the heim joint washer 112a may include any suitable profile, such as square, rectangular, oval, etc. The end surface 112e is configured to abut end surface 106b of the tubular body and may be selectively or fixedly coupled thereto using any suitable means, such as mechanical fasteners, friction fit, adhesives, welding, etc. The opposed end surfaces 112e, 112f define a threaded bore 112g therethrough that is configured to threadably engage a portion of the heim joint 112b.

The heim joint 112b may be any suitable articulating joint and includes an articulating head portion 112h and a threaded shank 112i (FIG. 11) extending therefrom. The threaded shank 112i is configured to threadably engage the threaded bore 112g of the heim joint washer 112a such that the heim joint 112b may translate within the heim joint washer 112a when the heim joint 112b is rotated. In this manner, the overall length of the actuator 102 can be increased or decreased by rotating the heim joint 112b in a first direction or second, opposite direction. The head portion 112h of the heim joint 112b defines a lumen 112j therethrough that is configured to receive a suitable fastener (e.g., bolt, pin, etc.) therein to rotatably couple the heim joint 112b, and thereby the actuator 102, to the actuator mounting flange 42 (FIG. 2) of the base 40.

The heim joint nut 112c is threadably coupled to the threaded shank 112i of the heim joint 112b. The heim joint nut 112c is configured to act as a jam nut such that when the heim joint nut 112c is threaded in a first direction, the heim joint nut 112c abuts the end surface 112f of the heim joint washer 112a, and further rotation of the heim joint nut 112c in the first direction tightens the heim joint nut 112c against the end surface 112f of the heim joint washer 112a to lock the position of the heim joint 112b relative to the heim joint washer 112a. To loosen the heim joint nut 112c, the heim joint nut 112c is rotated in a second, opposite direction.

Although generally described as being a heim joint, it is contemplated that the heim joint 112b may be any suitable articulating joint, and may be integrally formed with the actuator tube 106 or the heim joint washer 112a. In aspects, the heim joint 112b may be a ball bearing (stainless steel, bronze, brass, polymer, etc.) or a bushing (brass, bronze, polymer, etc.).

In aspects, the articulation system 100 may not utilize a heim joint assembly 112. Rather, an outer surface 106d of the tubular body 106 defines a transverse bore (not shown) that is configured to receive a suitable fastener (e.g., bolt, pin, etc.) therein to rotatably couple the tubular body 106, and thereby the actuator 102, to the actuator mounting flange 42 of the base 40.

The power screw 110 extends between a first end surface 110a and an opposite, second end surface 110b and defines a threaded outer surface 110c therebetween. The threaded outer surface 110c includes a threadform that is complimentary to that of the nut 108 such that the power screw 110 may threadably engage the threaded bore 108h of the nut 108. In this manner, as the power screw 110 is rotated in a first direction, the overall length of the actuator 102 increases and as the power screw 110 is rotated in a second, opposite direction, the overall length of the actuator 102 decreases. As will be described in further detail hereinbelow, the increase or decrease in the overall length of the actuator 102 causes articulation of the support structure 30 and solar array 20 about the pivot pin 56 of the pivot assembly 50 (FIG. 6).

The threaded outer surface 110c of the power screw 110 may define any suitable threadform (e.g., square, trapezoidal, buttress, etc.) capable of supporting and transmitting large loads, although other threadforms are also contemplated, such as triangular threadforms (e.g., uniform thread standard, etc.). In aspects, the power screw 110 may be a ball screw, a glidescrew, a leadscrew, etc. In one non-limiting aspect, the threaded outer surface 110c of the power screw 110 defines a trapezoidal threadform such as an acme threadform and has self-locking or anti-backdrive properties sufficient to inhibit the power screw 110 from rotating under the static weight of the solar array 20, support structure 30, and various components of the articulation system 100 that are supported by the power screw 110. Additionally, the anti-backdrive properties of the power screw 110 inhibit the power screw from rotating when an external force is applied to the solar tracking system 10, such as wind, snow, wildlife, etc. The first end surface 110a is configured to couple to a portion of the gearbox 120 such that a rotational force imparted on the gearbox 120 is transmitted to the power screw 110, as will be described in further detail hereinbelow.

The gearbox 120 includes an outer casing 122 and a gear train 126. The outer casing 122 (FIG. 9) defines a body 128 and a cover 130. The body 128 defines a generally square profile extending between opposed end surfaces 128a and 128b. The end surface 128a defines a cavity 128c therein terminating at an inner surface 128d. The inner surface 128d and the opposed end surface 128b define a through-bore 128e therethrough that is configured to receive a portion of the power screw 110 therein. As will be described in further detail hereinbelow, the through-bore 128e is dimensioned to permit articulation of the power screw 110 relative to the body 122 without causing interference (e.g., the power screw 110 is permitted to pivot relative to the body 122).

The body 128 defines a first pair of opposed side surfaces 128k and 128f and a second pair of opposed side surfaces 128g and 128h disposed transverse to the first pair of opposed side surfaces 128k, 128f. Each of the side surfaces of the first pair of opposed side surfaces 128k, 128f define a through-hole 128i therethrough that is configured to rotatably support a portion of an input shaft 132 therethrough and each of the side surfaces of the second pair of opposed side surfaces 128g, 128h defines a bore 128j (FIG. 9) therethrough that is configured to support a portion of an idler shaft 134 therein, as will be described in further detail hereinbelow. The cover 130 is configured to selectively couple to the end surface 128a using any suitable means, such as mechanical fasteners, adhesives, friction fit, etc.

The gear train 126 includes an input shaft 132, an idler shaft 134, a pair of support bushings 136, a drive gear 138, an idler gear 140, a driven gear 142, and a yoke 144. The input shaft 132 defines a generally cylindrical profile extending between a first end portion 132a and an opposite second end portion 132b. An outer surface 132c of the input shaft 132 defines a hole 132d adjacent each of the first and second end portions 132a, 134b that is configured to selectively receive a pin (not shown) or other suitable device capable of rotatably supporting and longitudinally fixing a driveshaft 150 (FIG. 7) of the solar tracking system 10, as will be described in further detail hereinbelow. The input shaft 132 is configured to be rotatably supported within the through-hole 128i of the first pair of opposed side surfaces 128e, 128f using any suitable means, such as a bushing, bearing, etc.

The idler shaft 134 defines a generally cylindrical profile extending between opposed end portions 134a and 134b. An outer surface 134c of the idler shaft defines a transverse bore 134d therethrough at a center portion thereof (e.g., approximately the middle of the idler shaft 134). The transverse bore 134*d* extends through the idler shaft 134 perpendicular to an axis A-A defined through the length (e.g., through the opposed end portions 134*a*, 134*b*) of the idler shaft 134 and is configured to receive a portion of the input shaft 132 therein. The transverse bore 134*d* is dimensioned such that the input shaft 132 may rotate about the axis A-A approximately 10 degrees in either direction (e.g., ±10°) without the input shaft 132 impacting any portion of the transverse bore 134*d* (e.g., the transverse bore 134*d* includes an inner dimension that is larger than an outer dimension of the input shaft 132), as will be described in further detail hereinbelow.

The pair of support bushings 136 defines a generally cylindrical profile extending between a first end surface 136*a* and a second, opposite end surface 136*b*. Each bushing of the pair of support bushings 136 is substantially similar, and therefore, only one support bushing 136 will be described in detail herein in the interest of brevity. The first end surface 136*a* defines an annular relief 136*c* extending through an outer surface of the support bushing 136 and extending towards the second end surface 136*b*. The annular relief 136*c* terminates at an annular face 136*d* having an outer dimension that is greater than the outer dimension of the annular relief. The second end surface 136*b* defines a first counterbore 136*e* therein extending towards the first end surface 136*a* and terminating at an annular face 136*f*. The annular face 136*f* of the first counterbore 136*e* defines a boss 136*g* extending therefrom and protruding past the second end surface 136*b* and terminating at a third end surface 136*h*. An outer surface of the boss 136*g* is configured to be received within the through-hole 128*i* of the outer casing 122 such that the outer casing 122 is rotatably supported thereon. The third end surface 136*h* and the first end surface 136*a* of the support bushing 136 define a through-bore (not shown) therethrough that is configured to rotatably support a portion of the input shaft 132 therein. The first end surface 136*a* defines a second counterbore 136*j* therein.

Although generally described as being a one-piece bushing (e.g., a single component), it is contemplated that the support bushing 136 may be formed from more than one component and in one non-limiting aspect, may be a bearing with a bushing, a bearing with an extended inner race (e.g., roller bearing, ball bearing, etc.), etc. As can be appreciated, the annular face 136*d* of the support bushing 136 is configured to abut a portion of a respective shear plate 38 of the support structure 30 to inhibit the support bushing 136 from entirely passing through a hole 38*c* of the shear plate 38. In this manner, the annular face 136*d* locates the support bushing 136 relative to the gearbox 134.

The yoke 144 defines a generally U-shaped profile having a planar surface 146 and opposed tabs 148 extending therefrom (FIG. 7). Although generally illustrated as having a triangular profile, it is contemplated that the opposed tabs 148 may include any suitable profile, and each tab may be the same or include different profiles. The planar surface 146 defines a bore (not shown) therethrough configured to receive a portion of the power screw 110 therein. It is contemplated that the bore may include a suitable bearing, bushing, etc. (not shown) or in aspects, may not include a bearing or bushing but rather at least one thrust bearing or bushing (not shown) may be disposed adjacent the planar surface 146 and concentric to the bore. The opposed tabs 148 define a through-hole (not shown) therethrough that is configured to support a portion of the idler shaft 134 therein. In aspects, the through-hole is dimensioned to fixedly retain the idler shaft 134 therein, such that the idler shaft 134 is inhibited from rotating about the axis A-A, although it is contemplated that the idler shaft 134 may freely rotate within the through-hole of the opposed tabs 148. Where the idler shaft 134 is fixedly retained within the through-hole, it is contemplated that the idler shaft 134 maybe fixedly retained using any suitable means, such as friction fit, keys, splines, adhesives, etc. Each of the opposed tabs 148 defines a boss 148*a* thereon that is concentric with the through-hole. Each boss of pair of bosses 148*a* is configured to be received within a respective the bore 128*j* of the outer casing 122 of gearbox 128 such that each bore 128*j* rotatably supports each respective boss 148*a* to enable the yoke 144 to rotate about an axis defined by the idler shaft 134.

The drive gear 138 is supported on the input shaft 132 and is coupled thereto using any suitable means, such as a clamp, friction fit, pins, etc., such that rotation of the input shaft 132 causes a corresponding rotation of the drive gear 138. Although generally shown as a bevel gear, it is contemplated that the drive gear 138 may be any suitable device capable of transmitting rotational motion from the input shaft 132 to the idler gear 140, and in one non-limiting aspect, the drive gear 138 may be a face-gear or the like.

The idler gear 140 is rotatably supported on the idler shaft 134 such that the idler gear 140 is free to rotate relative to the idler shaft 134 using any suitable means, such as a bushing, bearing, etc. The idler gear 140 is sized and dimensioned such that a portion of the idler gear 140 is able to mesh with the drive gear 138 and a portion of the idler gear 140 is able to mesh with the driven gear 142. Although generally illustrated as being a bevel gear, it is contemplated that the idler gear 140 may be any suitable device capable of transmitting rotational motion from the drive gear 138 to the driven gear 142.

The driven gear 142 is fixedly retained on a portion of the power screw 110 adjacent the first end surface 110*a* thereof using any suitable means, such as a clamp, friction fit, pins, etc., such that rotation of the driven gear 142 causes a corresponding rotation of the power screw 110. Although generally illustrated as being a bevel gear, it is contemplated that the driven gear 142 may be any suitable device capable of transmitting rotational motion from the idler gear 140 to the power screw 110. As can be appreciated, the driven gear 142 clamps the power screw 110 to the yoke 144 such that the power screw 110, and thus the driven gear 142, is inhibited from translating relative to the yoke 144.

In aspects, it is contemplated that the location of each of the drive gear 138, the idler gear 140, the driven gear 142, the pair of support bushings 136, and idler shaft 134 may be translatably fixed using circlips, e-clips, pins, adhesives, welding, etc. In this manner, the relative location of each of the drive gear 138, idler gear 140, driven gear, the pair of support bushings 136, and idler shaft 134 may be fixed relative to one another to ensure proper engagement of each of the drive gear 138, the idler gear 140, and the driven gear 142 during operation of the articulation system 100. In aspects, it is contemplated that any of the drive gear 138, idler gear 140, and driven gear 142 may be a face gear or the like.

It is contemplated that the gearbox 120 may not include a yoke 144, and rather the idler shaft 134 may be supported by the body 128 of the gearbox 120. In this manner, the body 128 of the gearbox supports the upper portion of the power screw 110, and the driven gear 142 clamps the power screw 110 to the body 128.

Returning to FIG. 3, the solar tracking system 10 includes an articulation system 100 disposed at each base 40, although it is contemplated that the solar tracking system 10 may include only one articulation system 100, an articulation system 100 may be disposed at every other base 40, or any other suitable pattern depending upon the installation needs of the solar tracking system 10. The placement of an articulation system 100 at each base 40 reduces the load each articulation system 100 is required to support. As a consequence, the overall size of the components of the articulation system 100 can be reduced, thereby saving materials and cost. Additionally, using multiple articulation systems 100 increases the overall stiffness of the solar tracking system 10 by reducing the distance between each point at which an articulation system 100 is placed, thereby reducing the torsional loading on the support structure 30, amongst other benefits. Further, using multiple actuation systems 100 reduces the need for the pivot pin 56 of the support structure 30 to be placed at the center of gravity of the support structure 30 and solar array 20 assemblies.

Figure 15:
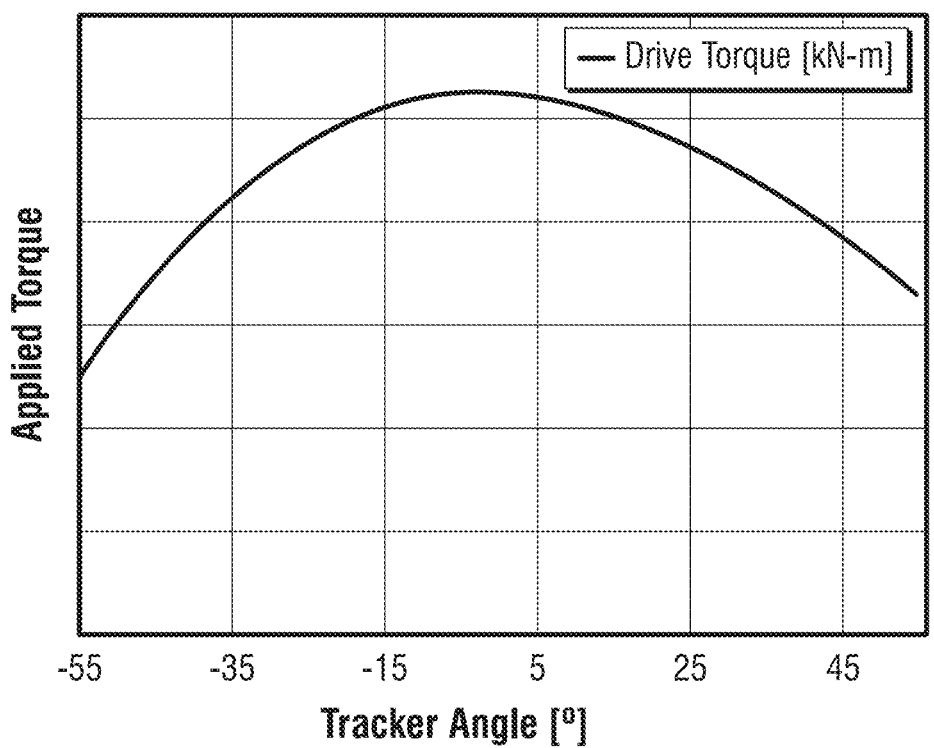
FIG. 15 is a graphical representation of the drive torque required to articulate a solar array of the solar tracking system of FIG. 1 through a range of motion.

As illustrated in FIG. 15, placement of the pivot pin 56 at the geometric center of rotation of the solar array 20 and support structure 30 assembly may cause an unbalanced load as the support structure 30 is articulated by the actuation assemblies 100. Specifically, when in an initial, east facing orientation, the amount of drive torque required to rotate the support structure 30 about the pivot pin 56 is relatively low. However, as the support structure is further rotated, the torque required to rotate the support structure 30 increases until the support structure 30 is placed in an approximately horizontal orientation. Continued rotation of the support structure 30 towards the west requires a diminishing amount of torque as the center of gravity of the solar array 20 and support structure 30 assembly migrates closer to the geometric center of rotation.

To diminish the effects of this unbalanced load, it is contemplated that the pivot pin 56 may be disposed at the center of mass of the solar array 20 and support structure 30 assembly rather than the geometric center of rotation. In this manner, the mass of the solar array 20 and support structure 30 is balanced about the pivot pin 56 and the torque required to articulate the support structure 30 about the pivot pin 56 remains substantially consistent, with little to no variation in the torque required to articulate the support structure through its range of motion. As such, the amount of energy required to articulate the support structure 30 is reduced and the various components required to support the solar array 20 may be substantially similar (e.g., no need to design certain components to take a larger load than others), thereby reducing design time and reducing the number of differing components in the solar tracking assembly 10. As can be appreciated, each solar array 20 may include a differing amount of wiring, actuation systems 100, driveshafts 150, etc. which necessarily means that each solar array 20 may include a different weight than one another. By shifting the axis of rotation from the geometric center of rotation to the center of mass, each solar array may include a different axis of rotation, which in turn, reduces unbalanced loads placed upon the articulation system 100.

Figure 4A:
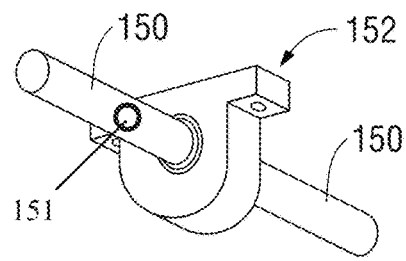
FIG. 4A is an enlarged view of the area of detail indicated in FIG. 4.
Figure 5:
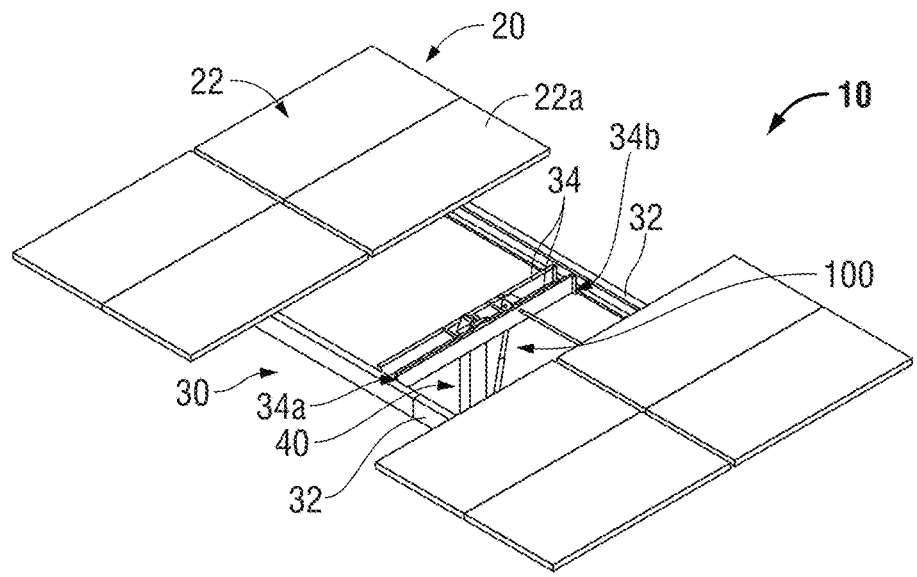
FIG. 5 is a top, perspective view of an articulation system of the solar tracking system of FIG. 1.

In order to transfer the torque between each articulation system 100, a plurality of driveshafts 150 (FIGS. 3, 4A, 6, and 7) are disposed on the support structure 30 and coupled to a respective input shaft 134 of a respective gearbox 120. By locating the plurality of driveshafts 150 on the support structure 30, each base 40 may remain identical, thereby reducing the number of variations of the base 40 required to construct the solar tracking system 10. It is contemplated that each of the plurality of driveshafts 150 may be rotatably supported by a bracket 152 (FIG. 4A), such as a pillow block, heim joint, bushing, etc., that is disposed on the bottom surface 22b of the photovoltaic modules 22 or the frame (not shown) of the photovoltaic modules 22. The outer dimension of the driveshaft 150 and the number of brackets 152 may vary depending on the installation needs of the solar tracking system 10. As can be appreciated, the larger the outer dimension of the driveshaft 150 and a greater number of brackets 152 increases the torsional load capacity of the driveshaft 150 while minimizing wind-up or twist in the driveshaft and reducing the proclivity of the driveshaft 150 to buckle under torsional load.

The bracket 152 inhibits buckling of the driveshaft 150 over its length, and therefore, enables a reduction in the overall diameter and wall thickness of the driveshaft 150 required to transfer a particular load without wind-up or buckling. In this manner, it is contemplated that one or more brackets 152 may be utilized. In one non-limiting aspect, two brackets 152 are utilized to support the driveshaft 150 at intervals of one third of the overall length of the driveshaft 150.

During fluctuations in temperature, the overall length of each solar array 20 may increase or decrease due to thermal expansion or contraction of the various components thereof. As can be appreciated, the location at which the gearbox 120 secures to the driveshaft 150 may vary due to the dimensional changes driven by thermal expansion or contraction of the driveshaft and/or support structure 30. To accommodate this fluctuation, the yoke 144 is rotatably supported within the outer casing 122 of the gearbox 120 about the longitudinal axis A-A. As such, as the support structure 30 expands and contracts and the gearbox 120 is caused to translate transverse to the actuator mounting flange 42 of the base 40, the actuator 102, via the heim joint 112b, is permitted to rotate about the fastener coupling the heim joint 112b to the mounting flange 42. The transverse bore 134d of the idler shaft 134 provides clearance for the input shaft 132 to pass therethrough without interference as the yoke 144, and therefore the idler shaft 134, rotates about the axis A-A. Further, the support bushings 38 inhibit the outer casing 122 of the gearbox 120 from rotating relative to the driveshaft 150 to inhibit binding or misalignment between the input shaft 132 of the gearbox 120 and the driveshaft 150.

With reference again to FIG. 4, the articulation system 100 includes a motor 160 and an associated motor gear box 162. The motor 160 may be any suitable motor capable of transmitting rotational motion to the driveshaft 150, such as an alternating current (AC) motor, a direct current (DC) motor, a servo, a stepper motor, etc. In one non-limiting aspect, the motor 160 is a brushless direct current (DC) motor. The motor 160 is coupled to the gear box 162 using any suitable means, such as mechanical fasteners, adhesives, welding, etc. In turn, the gear box 162 is coupled to the support structure 30 using any suitable means, such as mechanical fasteners, adhesives, welding, etc. It is contemplated that the gear box 162 may be any suitable gearbox capable of transmitting rotational motion from the motor 160 to the driveshaft 150, such as a constant mesh gear box, belts and pulleys, sprockets and chains, friction wheels, hydraulic, etc.

Continuing with FIG. 4, it is contemplated that each articulation system 100 may include a respective motor 160 and gear box 162, or in aspects, only one motor 160 and gearbox 162 may be utilized. In this manner, a motor 160 and/or gearbox 162 may be placed at any base 40 (regardless of the presence of an articulation system 100) and the rotational torque supplied by the motor 160 will be transferred to each articulation system 100 via the plurality of driveshafts 150. Each articulation system 100 is coupled to a controller 161 (FIG. 4), which, in turn, is coupled to the motor or motors 160 to actuate the motor or motors 160 to rotate the power screw 110 based on the determined position of the sun.

In one non-limiting aspect, the motor 160 and gearbox 162 may be placed at an outer-most base 40. In aspects, the motor 160 may be placed at any base 40 and may directly drive the plurality of driveshafts 150 without the use of the gearbox 162. As can be appreciated, utilizing multiple motors 160 reduces the size of the motor required to produce the appropriate amount of torque to articulate the support structure 30. Similarly, utilizing a gear box 162 reduces the size of the motor 160 required to produce the appropriate amount of torque to articulate the support structure 30. Further still, utilizing multiple motors 160 enables smaller and lighter driveshafts 150 to be utilized and reduces the number of brackets 152 that are required to inhibit buckling of the driveshafts 150, and in aspects, may eliminate the need for the driveshafts 150 altogether.

In aspects, each actuation system 100 may include a positive stop (not shown) or other similar device capable of inhibiting over extension thereof and to limit any damaged caused therefrom. As can be appreciated, the positive stop for each individual actuation system 100 may be calibrated to inhibit actuation of any one actuation system 100 relative to one another to a certain degree to minimize torsional loads and/or misalignment between adjacent solar arrays 20.

Figure 16:
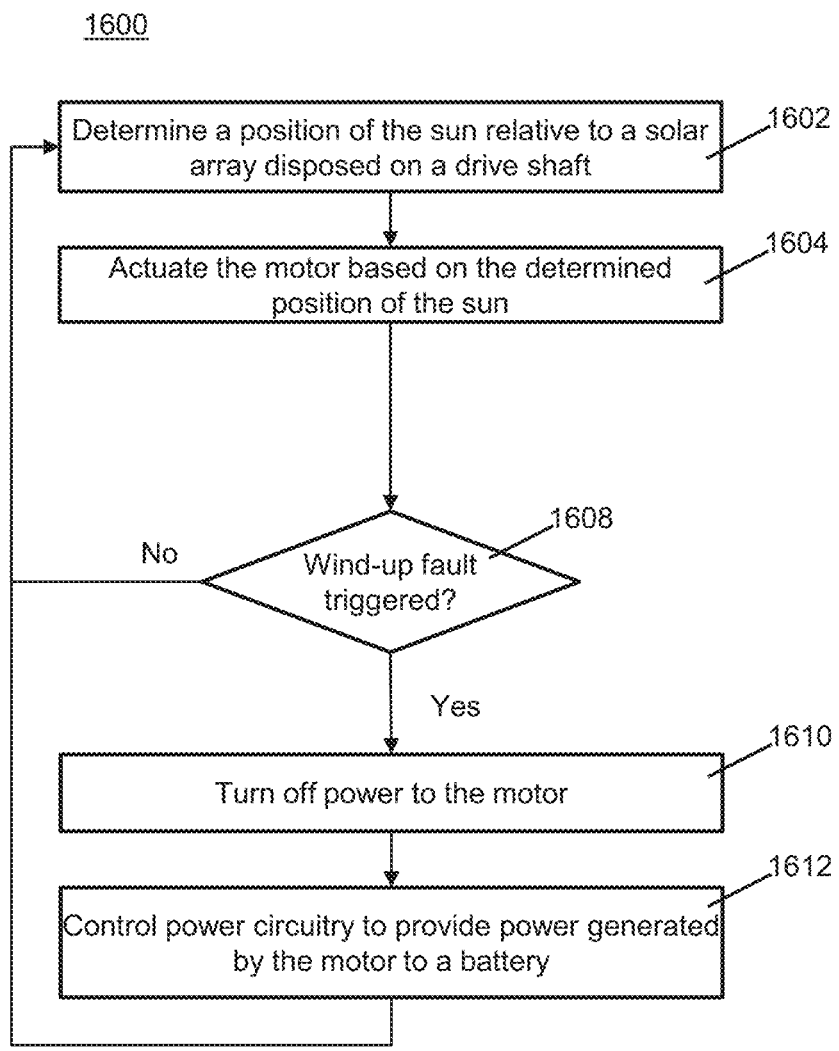
FIG. 16 is a flow diagram of a method of operating a solar tracker according to an aspect of the disclosure.

Referring again to FIGS. 1-13, a method 1600 of articulating a solar tracking system 10 is described with reference to FIG. 16. Initially, each actuation system 100 is calibrated to ensure that the position of each actuator 102 of the solar tracking system 10 is substantially the same. Placing each actuator 102 in the substantially same position reduces the amount of twist of the solar array 20. In aspects, each actuation assembly 100 may include a positive stop to ensure the actuator 102 does not over extend and damage components of the solar tracking system 10.

At block 1602, a position of the sun is determined relative to the solar array disposed on the driveshaft. After determining the position of the sun, a signal is transmitted from the controller 161 (FIG. 4) to the motor or motors 160 to actuate the motor or motors 160 to rotate the power screw 110 based on the determined position of the sun. If the sun is traveling in an east to west direction (e.g., daylight into twilight), the signal causes the motor 160 to rotate in a first direction, thereby causing the power screw 110 to rotate in a corresponding first direction to increase the overall length of the actuator 102. Increasing the length of the actuator 102 causes the support structure 30 to rotate clockwise about the pivot pin 56 and cause the solar array 20 to rotate in a corresponding clockwise direction. To set the position of the solar array 20, the signal causes the motor 160 to rotate in a second direction, opposite to the first direction, thereby causes the power screw 110 to rotate in a corresponding second direction that is opposite to the first direction to decrease the overall length of the actuator 102.

At block 1608, the process 1600 determines whether a wind-up fault has been issued or triggered. A torsion sensor 151 (FIG. 4A) may be disposed on or in the driveshaft and may be configured to sense torsion of the driveshaft. Alternatively, or additionally, a torque transducer may be disposed on or in the driveshaft to sense the torsion of the driveshaft. The torque transducer may be a torque transducer that measures static and/or dynamic torque or torsion. In some aspects, more than one torsion sensor or torque transducer may be disposed on or in the driveshaft along the length of the driveshaft.

The torsion sensor 151 may be in communication with the controller 161 (FIG. 4), which receives torsion sensor signals or data from the torsion sensor 151. Block 1608 may include reading torsion sensor data, determining whether the torsion sensor signal level is greater than a threshold, and, if the torsion sensor signal level is greater than the threshold, issuing a wind-up fault signal. The threshold may be set high enough such that small amounts of wind-up do not frequently trigger the wind-up fault.

While a wind-up fault is not triggered, the motor is actuated according to the determined position of the sun at blocks 1602 and 1604. If a wind-up fault is triggered at block 1608, the power to the motor is turned off at block 1610, and the power circuitry is controlled to provide power, which is generated by the motor as a result of the unwinding of the driveshaft, to a battery at block 1612. Alternatively, or additionally, the power circuitry may be controlled to provide power generated by the motor to an energy storage device or a heating element. The energy storage device may be a capacitor, such as a high-capacity capacitor, e.g., a supercapacitor or ultracapacitor. The heating element may be disposed in thermal communication with the battery to maintain the battery at an optimal charging and/or storage temperature. In some aspects, the heating may be used only during cold atmospheric conditions.

In other aspects, block 1612 may be replaced by a block that includes shorting the terminals of the motor or connecting the terminals of the motor to a resistive load. Accordingly, if a wind-up fault is detected at block 1608, the power to the motor is turned off at block 1610, and the power circuitry is controlled, e.g., by the controller 161, to short the terminals of the motor or connect the terminals of the motor to a resistive load. For example, the power circuitry may include a relay that switches the terminals of the motor between a connection to a power source and a connection to a resistive load or a circuit configured to safely short the terminals of the motor. The resistive load may be selected to have a resistance value that achieves a desired amount of force to counter the force from the unwinding of the driveshaft, e.g., braking force. In some aspects, the resistive load may be configured to have variable resistance values to allow for tuning of the force to counter the force from the unwinding of the driveshaft.

In aspects, the controller of the disclosure may be implemented by a computer system and/or suitable electrical circuitry. For example, aspects of the controller may operate on, or be controlled by, a number of different computer systems including general purpose networked computer systems, embedded computer systems, routers, switches, server devices, client devices, various intermediate devices/nodes, stand-alone computer systems, and the like. In an aspect, the computer system includes an address/data bus for communicating information. For example, the computer system may include a main logic board having a central processing unit coupled to the bus for processing information and instructions, which include instructions for implementing the methods of the disclosure, e.g., the method of FIG. 16.

The main logic board of the computer system may also include data storage features such as volatile memory, e.g., dynamic random access memory (DRAM), coupled to the bus for storing information and instructions for the central processing unit. Non-volatile memory, e.g. read only memory (ROM), may also be coupled to the bus and/or mounted on the main logic board for storing static information and instructions for the central processor. In addition to processing and storage hardware, the computer system may include various input and output devices. For example, the computer system may include an alphanumeric input device and/or a cursor control device coupled to the bus for communicating user input information and commands to the central processing unit. Likewise, the computer system may include a display coupled to the bus for displaying information to a user.

In aspects, the controller and the power circuitry may be integrated together, e.g., integrated into the same circuit board, e.g., a printed circuit board. Alternatively, the controller may be implemented by computer system and the power circuitry, e.g., one or more relays, may be implemented on a separate circuit board. The separate circuit board may be a standalone circuit board.

While several aspects of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular aspects. For example, the disclosure describes particular implementations of solar tracking systems and their subsystems including solar arrays, support structures, driveshafts, bases, articulation systems, power circuitry, and controllers; however, aspects of the disclosure may be applied to other implementations of the solar tracking systems and their subsystems.

The invention claimed is:

1. A method of articulating a solar tracking system, comprising:
    determining a position of the sun relative to a solar array disposed on a driveshaft, the driveshaft rotatably supported by a plurality of bases;
    actuating a motor mechanically coupled to the driveshaft based on the determined position of the sun relative to the solar array;
    determining a fault caused by a winding up of the driveshaft; and
    in response to determining the fault, controlling power circuitry to provide power generated in the motor by an unwinding of the driveshaft to a load.

2. The method of articulating a solar tracking system according to claim 1, wherein determining the fault includes detecting the winding up of the driveshaft by a torsion sensor disposed on or in the driveshaft.

3. The method of articulating a solar tracking system according to claim 1, further comprising changing a length of a plurality of actuators associated with the plurality of bases to rotate the solar array relative to the plurality of bases, wherein rotation of the solar array corrects an orientation of the solar array relative to the sun.

4. The method of articulating a solar tracking system according to claim 3, wherein changing the length of the plurality of actuators includes causing a motor mechanically coupled to a gearbox associated with the plurality of actuators to rotate, wherein rotation of the motor causes the gearbox to change the length of the plurality of actuators.

5. The method of articulating a solar tracking system according to claim 3, wherein changing the length of the plurality of actuators includes causing a motor coupled to a plurality of driveshafts to cause a plurality of gearboxes associated with a respective actuator of the plurality of actuators to rotate, wherein rotation of the motor causes the plurality of driveshafts to rotate, which in turn, causes the plurality of gearboxes to change the length of the plurality of actuators, further comprising:
    determining a fault caused by a winding up of one of the plurality of driveshafts; and
    in response to determining the fault, controlling power circuitry to provide power generated in the motor by an unwinding of the one of the plurality of driveshafts to a load.

6. The method of articulating a solar tracking system according to claim 3, wherein changing the length of the plurality of actuators includes causing a plurality of motors coupled to a respective plurality of gearboxes associated with the plurality of actuators to rotate, wherein rotation of the plurality of motors causes each respective gearbox to change the length of each respective actuator of the plurality of actuators.

7. The method of articulating a solar tracking system according to claim 1, wherein the load is a battery or a heating element.

* * * * *